United States Patent
Katta (10) Patent No.: US 12,039,054 B2
(45) Date of Patent: Jul. 16, 2024

(54) SYSTEMS AND METHODS FOR DYNAMIC DETECTION OF VULNERABLE CREDENTIALS

(71) Applicant: Citrix Systems, Inc., Ft. Lauderdale, FL (US)

(72) Inventor: Rama Rao Katta, Fremont, CA (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 244 days.

(21) Appl. No.: 17/358,765

(22) Filed: Jun. 25, 2021

(65) Prior Publication Data

US 2022/0414226 A1    Dec. 29, 2022

(51) Int. Cl.
*G06F 21/57*    (2013.01)

(52) U.S. Cl.
CPC ...... *G06F 21/577* (2013.01); *G06F 2221/034* (2013.01)

(58) Field of Classification Search
CPC .. G06F 21/577; G06F 2221/034; G06F 21/46; H04L 63/083; H04L 63/1433
See application file for complete search history.

(56) References Cited

U.S. PATENT DOCUMENTS

| | | | | |
|---|---|---|---|---|
| 7,027,997 B1 * | 4/2006 | Robinson | ......... | G06Q 10/06311 719/310 |
| 8,464,318 B1 * | 6/2013 | Hallak | ......... | H04L 63/1416 726/4 |
| 10,440,042 B1 * | 10/2019 | Stein | ......... | G06N 20/00 |
| 11,201,896 B1 * | 12/2021 | Watters | ......... | H04L 63/1466 |
| 2004/0054966 A1 * | 3/2004 | Busch | ......... | G06Q 30/02 715/223 |
| 2005/0021975 A1 | 1/2005 | Liu | | |
| 2005/0114678 A1 | 5/2005 | Bagga et al. | | |
| 2005/0149922 A1 * | 7/2005 | Vincent | ......... | G06F 8/656 717/172 |
| 2005/0198300 A1 * | 9/2005 | Gong | ......... | G06F 16/9577 709/227 |
| 2009/0019313 A1 * | 1/2009 | Pokala | ......... | G06F 9/451 714/37 |

(Continued)

OTHER PUBLICATIONS

Perry, K. (Mar. 10, 2019). Honeypot Technique of Blocking Spam. Retrieved Apr. 5, 2021, from www.thryv.com, 6 pages.

(Continued)

*Primary Examiner* — Meng Li (57) ABSTRACT

A computer system is provided. The computer system includes a memory and at least one processor coupled to the memory and configured to detect a request for a sign-up form from a client device to a remote server. The at least one processor is further configured to generate a code module based on the detection. The code module is configured to request a credential vulnerability check from an application management server. The at least one processor is further configured to provide the code module to the client device for execution on the client device in response to an attempted submission of the sign-up form. The at least one processor is further configured to receive a result of the credential vulnerability check from the client device and perform a security action in response to the credential vulnerability check indicating vulnerable credentials.

21 Claims, 7 Drawing Sheets

(56) References Cited

U.S. PATENT DOCUMENTS

| | | | |
|---|---|---|---|
| 2012/0079575 A1* | 3/2012 | Yue | H04L 63/123 |
| | | | 726/3 |
| 2013/0091578 A1* | 4/2013 | Bisht | G06F 21/53 |
| | | | 726/25 |
| 2013/0247204 A1* | 9/2013 | Schrecker | H04L 45/306 |
| | | | 726/25 |
| 2013/0263264 A1* | 10/2013 | Klein | G06F 21/554 |
| | | | 726/23 |
| 2017/0346829 A1* | 11/2017 | Gordon | H04L 63/08 |
| 2018/0332079 A1 | 11/2018 | Ashley et al. | |
| 2020/0304541 A1* | 9/2020 | Ou | H04W 12/71 |
| 2021/0044976 A1* | 2/2021 | Avetisov | H04L 63/0815 |
| 2021/0117533 A1* | 4/2021 | Malka | H04L 9/008 |
| 2021/0234857 A1* | 7/2021 | Nakagawa | H04L 9/3236 |
| 2021/0392048 A1* | 12/2021 | Olden | H04L 41/0816 |
| 2022/0311770 A1* | 9/2022 | Shieh | H04L 63/102 |
| 2022/0345459 A1* | 10/2022 | Tseng | H04L 63/0245 |
| 2022/0414226 A1* | 12/2022 | Katta | G06F 21/577 |

OTHER PUBLICATIONS

International Search Report and Written Opinion for International Application No. PCT/US2022/033595; Date of Mailing Oct. 5, 2022; ( 13 pages).

Hannah Li et al: "Horcrux: A Password Manager for Paranoids", arxiv.org, Cornell University Library, 201 Olin Library Cornell University Ithaca, NY 14853, Jun. 15, 2017 (Jun. 15, 2017), XP080770234,.

* cited by examiner

SYSTEMS AND METHODS FOR DYNAMIC DETECTION OF VULNERABLE CREDENTIALS

BACKGROUND

Cyber security is an issue of great importance, as attacks on computer systems and the users of those systems continue to increase. One of the most prevalent, and often most successful, forms of attack involve the automated injection of compromised or breached credentials (e.g., username and password) into web browser sign-up forms in order to fraudulently gain access to user accounts. The credentials may have been compromised because they were weak (e.g., too short/simple), easily guessed, or otherwise stolen. Compromised credentials are often sold to hackers or circulated over the internet. Users are typically unaware of the fact that their credentials have been compromised and do not act until the damage has been done. For example, after the user notices an authorized withdrawal from their bank account, they change their password.

SUMMARY

In at least one example, a computer system is provided. The computer system includes a memory; and at least one processor coupled to the memory and configured to: detect a request for a sign-up form from a client device to a remote server; generate code based on the detection, the code configured to request a credential vulnerability check from an application management server; provide the code to the client device for execution on the client device; receive a result of the credential vulnerability check from the client device; and perform a security action in response to the credential vulnerability check indicating vulnerable credentials.

At least some examples of the computer system can include one or more of the following features. The security action includes requiring that the vulnerable credentials be updated. The security action includes blocking submission of the sign-up form to the remote server. The security action includes one or more of providing a warning to the client device, logging the vulnerability, and generating an alert to an administrator. The code is JavaScript. the code includes an on-submit event handler configured to trigger execution of the code in response to a submission of the sign-up form. The code is further configured to generate a hash of credentials included in the sign-up form and to include the hash in the request for the credential vulnerability check.

In at least one example, a method for detection of vulnerable credentials is provided. The method includes detecting, by a computer system, a request for a sign-up form from a client device to a remote server; generating, by the computer system, code based on the detection, the code configured to request a credential vulnerability check from an application management server; providing, by the computer system, the code to the client device for execution on the client device; receiving, by the computer system, a result of the credential vulnerability check from the client device; and performing, by the computer system, a security action in response to the credential vulnerability check indicating vulnerable credentials.

At least some examples of the method can include one or more of the following features. Performing the security action includes requiring that the vulnerable credentials be updated. Performing the security action includes blocking submission of the sign-up form to the remote server. Performing the security action includes one or more of providing a warning to the client device, logging the vulnerability, and generating an alert to an administrator. Generating the code includes generating JavaScript. Generating the code includes generating an on-submit event handler configured to trigger execution of the code in response to a submission of the sign-up form. Generating the code includes generating code configured to generate a hash of credentials included in the sign-up form and to include the hash in the request for the credential vulnerability check.

In at least one example, a non-transitory computer readable medium storing executable sequences of instructions to provide detection of vulnerable credentials is provided. The sequences of instructions include instructions to: detect a request for a sign-up form from a client device to a remote server; generate code based on the detection, the code configured to request a credential vulnerability check from an application management server; provide the code to the client device for execution on the client device; receive a result of the credential vulnerability check from the client device; and perform a security action in response to the credential vulnerability check indicating vulnerable credentials.

At least some examples of the non-transitory computer readable medium can include one or more of the following features. The security action includes requiring that the vulnerable credentials be updated. The security action includes blocking submission of the sign-up form to the remote server. The security action includes one or more of providing a warning to the client device, logging the vulnerability, and generating an alert to an administrator. The code is JavaScript. The code includes an on-submit event handler configured to trigger execution of the code in response to a submission of the sign-up form. The code is further configured to generate a hash of credentials included in the sign-up form and to include the hash in the request for the credential vulnerability check.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical

DETAILED DESCRIPTION

As noted previously, cyber security is a growing concern as attacks on computer systems and the users of those systems increase. Compromised or breached credentials (e.g., usernames and passwords) can be obtained by bad actors (or bots) and used to gain fraudulent access to user accounts or confidential information. The credentials may have been compromised because they were weak (e.g., too short/simple), easily guessed, or otherwise stolen, and can be sold to hackers or otherwise circulated over the internet. Many users are unable or unwilling to expend the time and effort to investigate the security of their passwords and take corrective action, either because they do not realize that their credentials are vulnerable or because they are too busy.

To address these and other problems, and as summarized above, various examples described herein are directed to systems and methods for dynamic detection of vulnerable credentials, to prevent or discourage users from entering weak or known username/password combinations in sign-up forms or during password reset requests.

In some examples, the disclosed techniques provide credential vulnerability protection by detecting a login attempt from a user, and dynamically generating an executable code module that is configured to request a vulnerability check, in response to that detection. For example, a user on a client device employs a web browser to navigate to a remote server that hosts a web site which requires a login. The web browser submits a sign-up form request to the remote server, on behalf of the user, which is detected by an Application Delivery and Security (ADS) server. The ADS server then generates the executable code module and delivers it to the client. In some examples, the code module is a JavaScript module. The code module includes an on-submit event handler that triggers execution of the module in response to a submission of the completed sign-up form that contains the user credentials. The code module is configured to extract the credentials and send a request to a vulnerability checking service to validate the credentials (e.g., determine whether they are vulnerable or safe). The code module is further configured to transmit the results of the vulnerability check back to the ADS server. An appropriate security action can then be performed based on the results of the vulnerability check. In some examples, the security action may include one or more of blocking the credential submission to the remote server, requiring that the vulnerable credentials be updated, providing a warning to the client device, logging the vulnerability, and generating an alert to an administrator.

In some examples, the disclosed techniques provide a capability for password validation (e.g., vulnerability checking) to any web-based or internet-facing applications without requiring modification of the application. This is accomplished by virtue of the dynamic generation of the executable code module, which is provided to the client for execution on the client device in response to credential submission by the user. The disclosed techniques allow information technology (IT) administrators to maintain consistent password update/password-setting rules across all IT provided applications. For example, whether the user is interacting with a web browser or another type of internet facing application (e.g., an email application), the disclosed techniques may be employed to detect submission of vulnerable credentials and enforce a password update that conforms to current IT administration rules and policies.

These systems and methods overcome a security problem in which vulnerable credentials can be exploited. For example, a user may attempt to enter a vulnerable username/password, and the disclosed techniques will warn or prevent the user from submitting those credentials to a web site sign-on page, and encourage or require the user to update their credentials.

As will be understood in view of this disclosure, the systems and methods for dynamic detection of vulnerable credentials provided herein have advantages over existing methods which rely on user vigilance, which is subject to lapse, to check and update their passwords. For instance, the systems and methods described herein provide automated protection and do not rely on user action.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Vulnerable Credential Detection System

Figure 1:
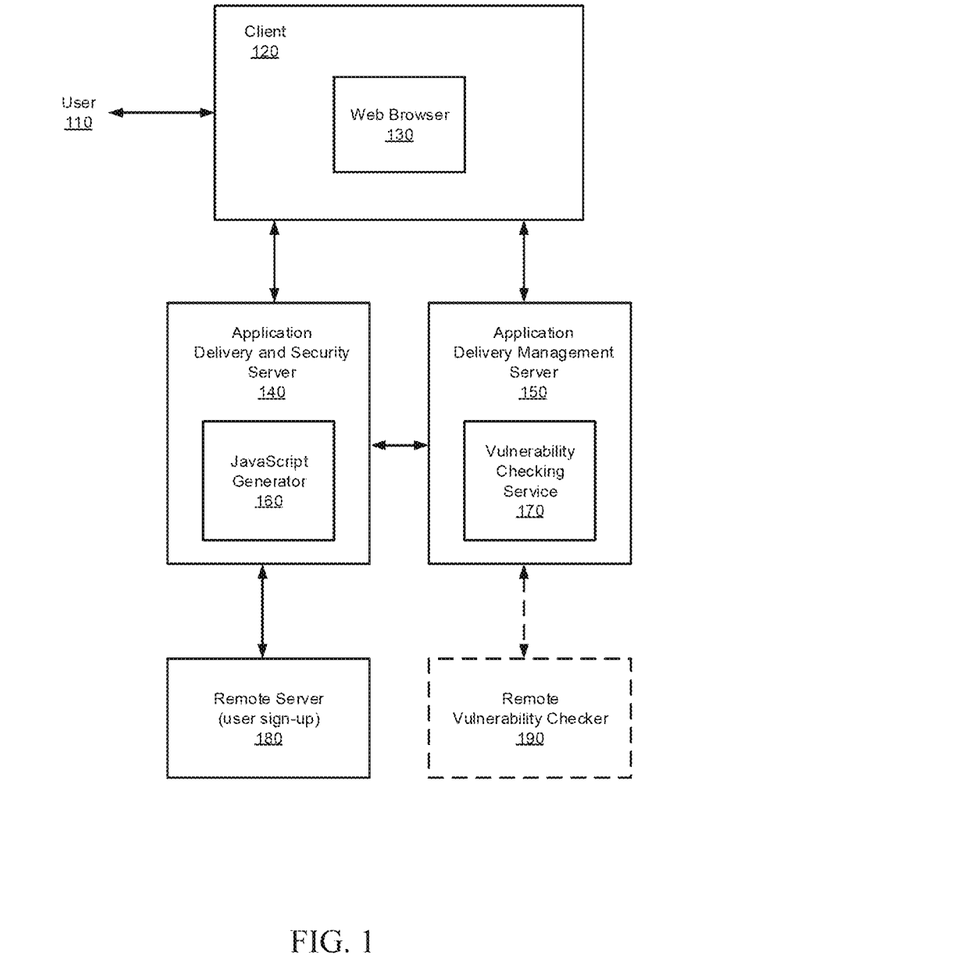
FIG. 1 is a top-level block diagram of an implementation of a system for providing dynamic detection of vulnerable credentials, in accordance with an example of the present disclosure.

FIG. 1 is a top-level block diagram of an implementation of a system 100 for providing dynamic detection of vulnerable credentials, in accordance with an example of the present disclosure. As shown in FIG. 1, the system comprises a client 120, an ADS server 140, and an Application Delivery Management (ADM) server 150. The client 120 (e.g., a device such as a laptop, mobile device, workstation, etc.) is configured to execute a web browser 130 which allows the user 110 of the client device to navigate to desired web sites which are hosted on remote servers 180, and potentially login to those sites by providing credentials (e.g., a username and password) on a sign-up form.

At a high level, the ADM server 150 is configured to provide an application delivery service to the client. For example, in some cases, the ADM server can provide centralized management of the delivery of applications to clients, including load-balancing of application execution, visibility of application execution for system and network administrators, and monitoring and troubleshooting capabilities, to name just a few possible functions. Also, at a high level, the ADS server 140 is configured to provide a variety of security functions associated with the delivery of applications by the ADM server 150. For example, in some cases, the ADS server can provide a web application firewall, distributed denial of service protection, and bot management, to improve application security. In some examples, the ADM server 150 and ADS server 140 may be hosted on the same, or on different hardware platforms.

In accordance with an example of the present disclosure, the ADS server 140 is shown to include a JavaScript generator 160 which is configured to dynamically generate an executable code module (e.g., a JavaScript module) to be provided to the client for execution on the client device. The JavaScript module is configured to request a credential vulnerability check, from the ADM server 150, when credentials are submitted (e.g., in a sign-up form) to a remote server 180, as will be explained in greater detail below.

Also, in accordance with an example of the present disclosure, the ADM server 150 is shown to include a credential vulnerability checking service 170, which is configured to determine whether the provided credentials are vulnerable, for example, by checking against a database of passwords that are known to be vulnerable, or by any other suitable means, as will be explained in greater detail below. In some cases, the ADM server 150 may offload the vulnerability checking task to a remote (e.g., third party) vulnerability checking service 190, such as "HaveIBeenPwned.com".

Vulnerable Credential Detection Process

As described above, some examples of the system 100 of FIG. 1 are configured to perform a process for providing dynamic detection of vulnerable credentials. The processes may be executed on a processor of any suitable type (e.g., processor 610 of FIG. 6).

Figure 2A:
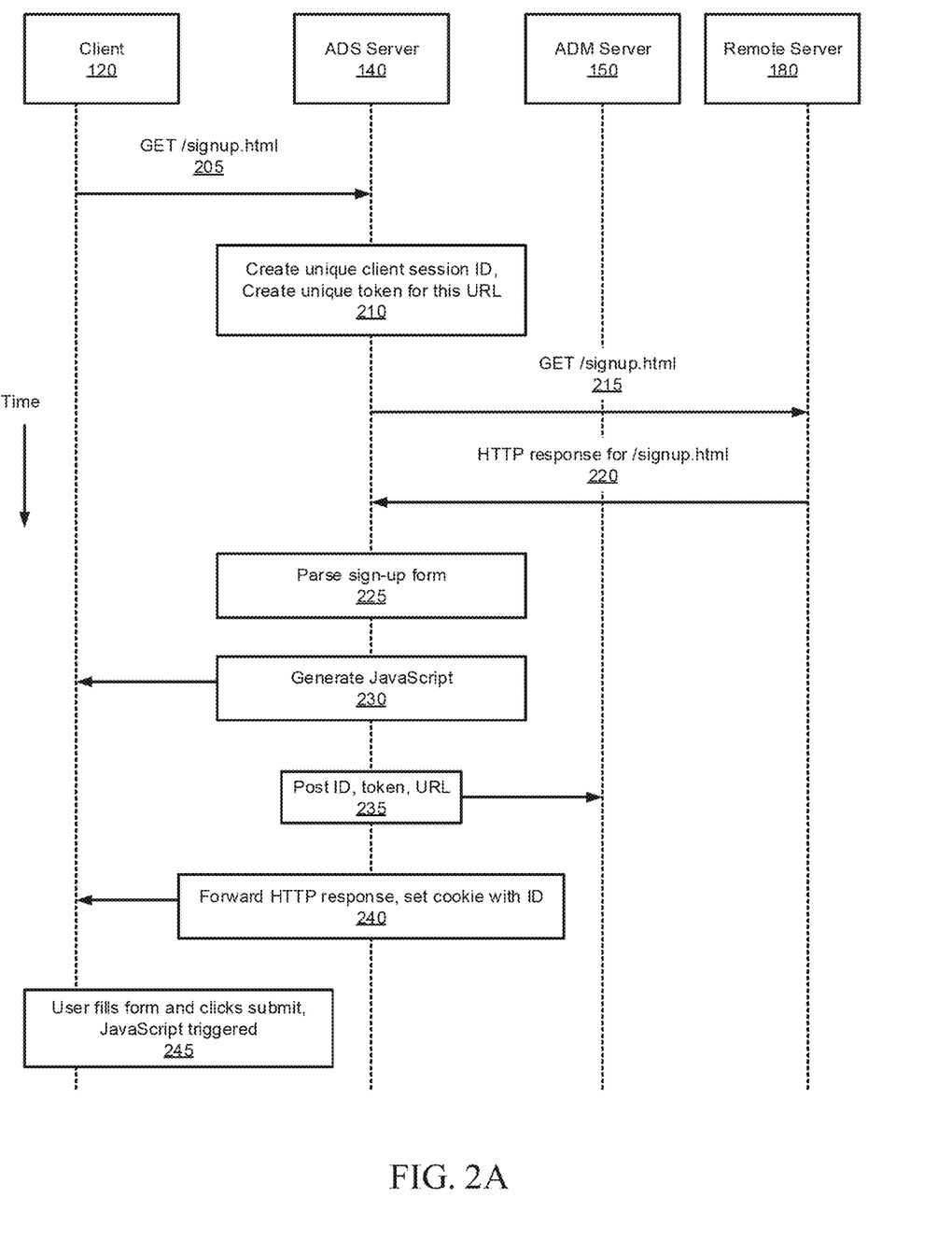
FIG. 2A is a sequence diagram of a vulnerable credential detection process, in accordance with an example of the present disclosure.
Figure 2B:
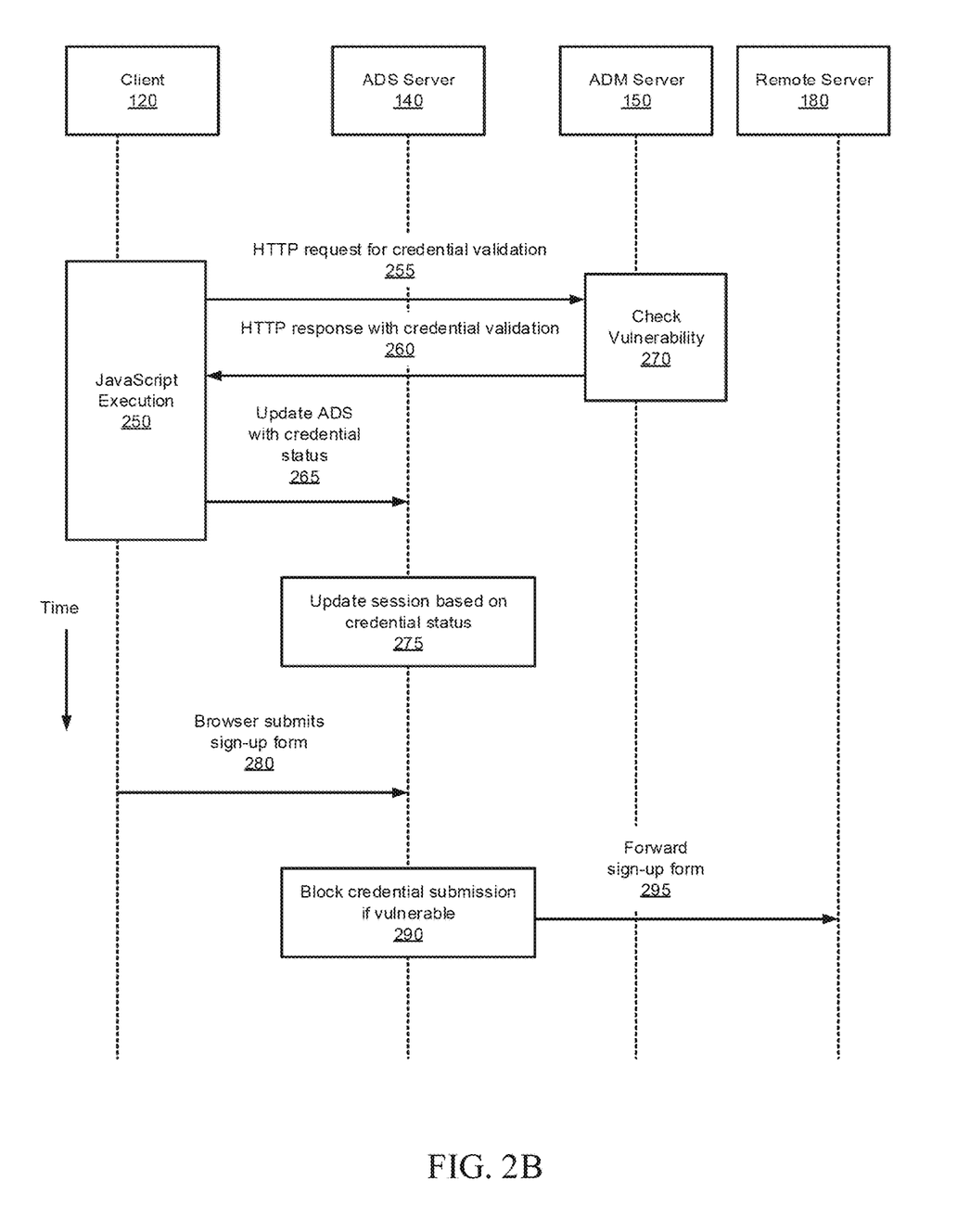
FIG. 2B is a continuation of the sequence diagram of the vulnerable credential detection process of FIG. 2A, in accordance with an example of the present disclosure.

FIGS. 2A and 2B illustrate a sequence diagram 200 of the vulnerable credential detection process, in accordance with an example of the present disclosure. The sequence diagram illustrates interactions between entities (client device 120, ADS server 140, ADM server 150, and remote server 180, of FIG. 1) in the horizontal direction, over time in the vertical direction.

At operation 205, the client device 120 navigates to a web page at a specified Uniform Resource Locator (URL), using the browser 130, of FIG. 1, to request a sign-up form. The sign-up form is a form into which credentials can be entered, for example, for the purpose of logging in. The sign-up form is provided by a website associated with the URL, which is hosted on the remote server 180. The request is in the form of a Hypertext Transfer Protocol (HTTP) GET command (e.g., GET/signup.html).

At operation 210, the ADS server 140 intercepts the sign-up form request. The ADS server 140 is configured to intercept messages that are transmitted between the client 120 and other parties, such as the remote server 180, so that analysis or other actions may be performed prior to forwarding the message on to its intended destination or deciding to block the message. Continuing with operation 210, the ADS server 140 creates a unique client session ID and unique token based on the intercepted sign-up form request. The client session ID is associated with the client device (and with the user of the device). In some cases, the ADS server 140 may handle multiple client devices, each with a unique session ID. The token is associated with the URL. In some cases, the client may be interacting with multiple URLs and each URL will have a unique token. The combination of the client session ID together with the token identifies the URL being accessed by the client. At operation 215, the ADS server 140 forwards the sign-up form request to the remote server 180. At operation 220, the ADS server 140 intercepts the HTTP response (containing the sign-up form) from the remote server 180.

At operation 225, the ADS server 140 parses the sign-up form to determine the mechanism for form submission (e.g., a submit button, or the like). At operation 230, the ADS server 140 generates a module of executable code, which includes an on-submit event handler, and provides that module to the client 120. In some cases, the code module is a JavaScript module, although other programming languages may be used. The code module, hereinafter referred to as the JavaScript, is configured to execute on the client 120 and request a credential vulnerability check from the ADM server 150. The request is triggered by an on-submit event, as will be explained in greater detail below.

At operation 235, the ADS server 140 posts the client session ID, token, and URL to the ADM server 150 to prepare the ADM server for a subsequent vulnerability check request from the client 120.

At operation 240, the ADS server 140 forwards the HTTP response (containing the sign-up form) to the client 120, and also creates a cookie for the client web browser 130 to contain the client session ID.

At operation 245, the user fills in the sign-up form and clicks submit (or performs some action to cause the form to be submitted). Execution of the JavaScript is then triggered by the on-submit event handler.

Continuing with FIG. 2B, at operation 250, the JavaScript is executed, as will be described in greater detail below in connection with FIG. 3, but at a high level, the following functions are performed. At operation 255 an HTTP request for credential validation is sent by the JavaScript from the client 120 to the ADM server 150. At operation 270, the ADM server performs a vulnerability check on the credentials, using any suitable techniques in light of the present disclosure (e.g., checking against a database of passwords that are known to be vulnerable). In some cases, the ADM server may offload this task to a remote third party vulnerability checking service 190. At operation 260, the ADM server sends an HTTP response back to the client. The response includes the results of the credential validation. At operation 265, the credential status (e.g., vulnerable/not-vulnerable) is sent by the JavaScript from the client 120 to the ADS server 140.

At operation 275, the ADS server 140 updates the state of the session (between the client 120 and the remote server 180) based on the received credential status.

At operation 280, the browser 130 submits the sign-up form which is intercepted by the ADS server 140. At operation 290, the ADS server blocks the credential submission if the credentials are vulnerable (based on the state of the session, as set during operation 275). In some cases, additional security actions may be taken, including one or more of requiring that the vulnerable credentials be updated, providing a warning to the client device, logging the vulnerability, and generating an alert to an administrator. Otherwise, at operation 295, the ADS server forwards the sign-up form to the remote server 180, allowing the credentials to be submitted.

Figure 3:
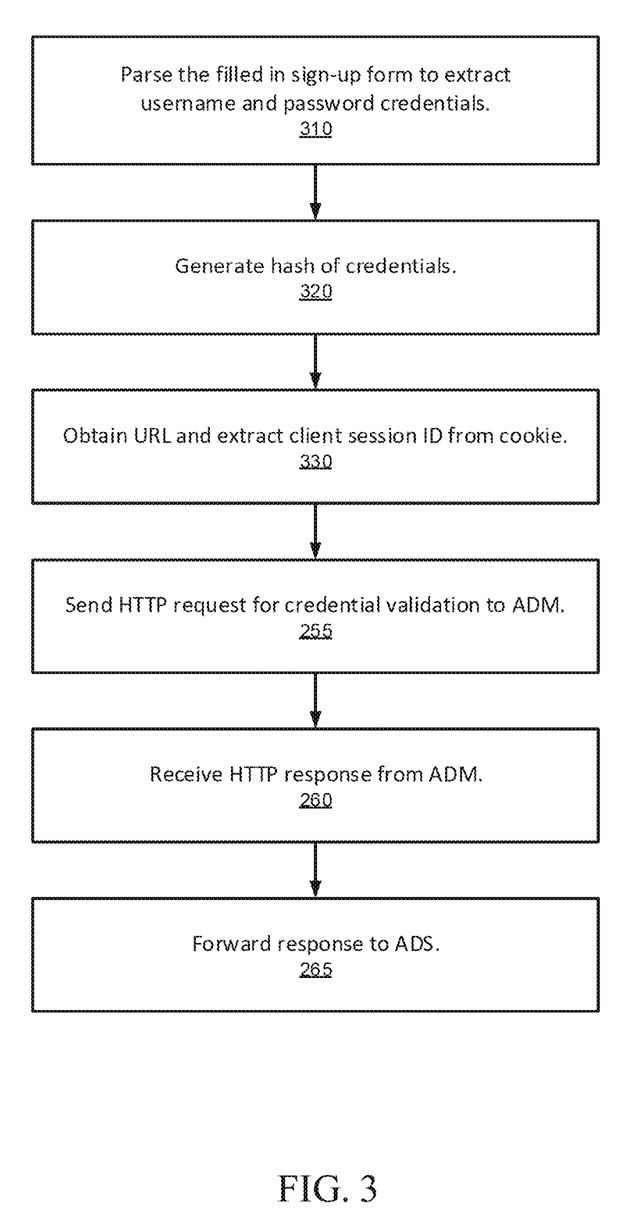
FIG. 3 is a flow diagram of a process performed by the generated JavaScript, in accordance with an example of the present disclosure.

FIG. 3 is a flow diagram of the process 250, of FIG. 2, for dynamic detection of vulnerable credentials executed by the generated JavaScript, in accordance with an example of the present disclosure. The process 250 starts at operation 310, with the JavaScript parsing the sign-up form (as filled in by the user) to extract the credentials (e.g., username and password).

Next, at operation 320, a hash of the credentials is generated so that the credentials are not subsequently transmitted in plain text form. In some cases, an encryption of the credentials may be used as a more secure alternative to the hash.

At operation 330, the URL is obtained, and the client session ID is extracted from the cookie. At operation 255, of FIG. 2 as previously described, an HTTP request for credential validation is sent to the ADM server 150, of FIG. 1. The HTTP request includes the URL and the client session ID. At operation 260, of FIG. 2, an HTTP response from the ADM server 150 is received. The response includes the results of the credential validation. At operation 265, of FIG. 2, the credential status (e.g., vulnerable/not-vulnerable) is forwarded to the ADS server 140, of FIG. 2.

Figure 4:
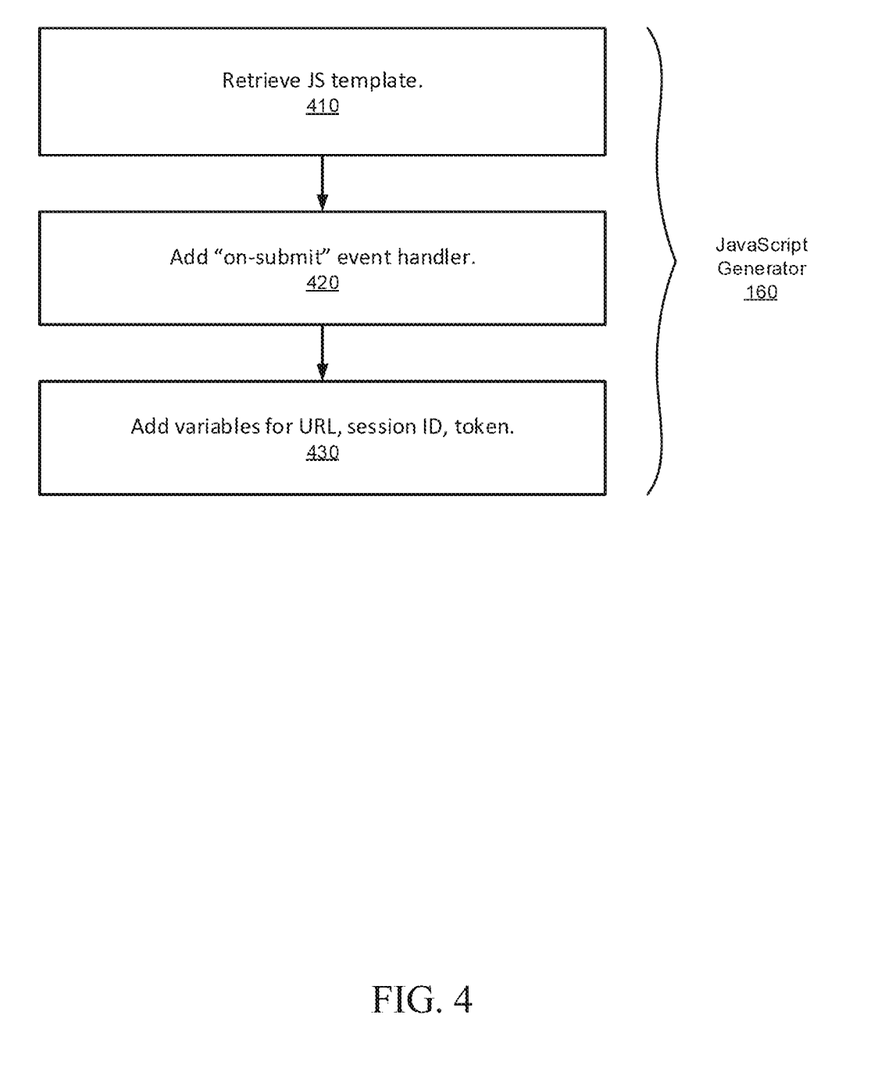
FIG. 4 is a flow diagram of a process for generating the JavaScript, in accordance with an example of the present disclosure.

FIG. 4 is a flow diagram of a process 400 for dynamic generation of the JavaScript, in accordance with an example of the present disclosure.

At operation 410, a JavaScript template is retrieved, for example from a store of pre-existing templates. In some cases, the template is configured to provide generic execution capabilities that are compatible with the hardware (e.g., processor) and operating system of client device 120, of FIG. 1.

At operation 420, an on-submit event handler is installed in the template. The on-submit event handler is configured to trigger execution of the JavaScript, for example by the client device operating system or web browser 130, of FIG. 1, in response to an action by the user 110, of FIG. 1, that would cause submission of the sign-up form to the remote server 180, of FIG. 1.

At operation 430, variables, and code associated with managing those variables, are added to the template. The variables are configured to store one or more of the URL, the client session ID, and the unique token, as well as any other state information that may be useful.

The completed JavaScript code module is configured to execute on the client in response to an on-submit event associated with the sign-up form, request a credential vulnerability check from the ADM server 150, of FIG. 1, and report the results back to the ADS server 140, of FIG. 1.

Figure 5:
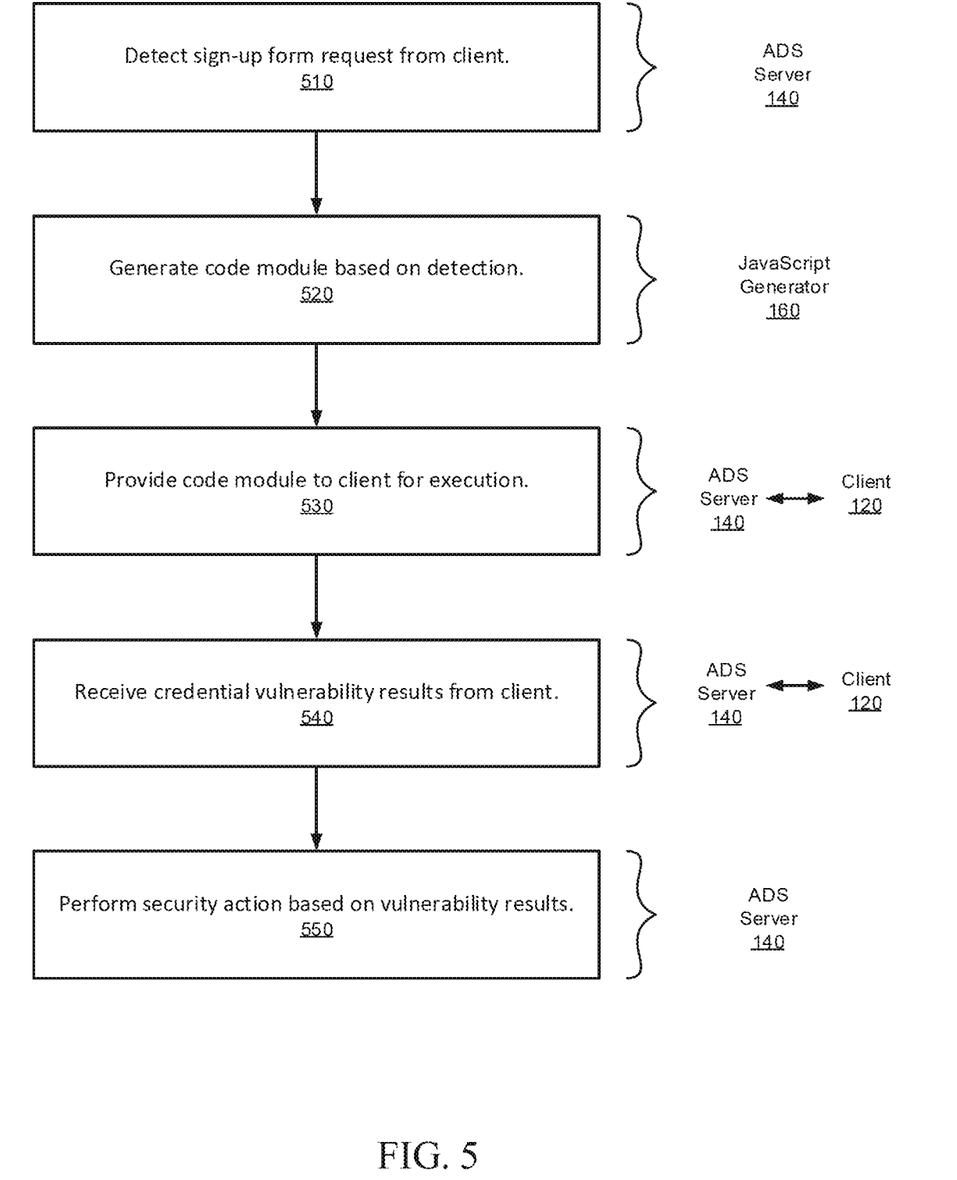
FIG. 5 is a flow diagram of a process for detection of vulnerable credentials, in accordance with an example of the present disclosure.

FIG. 5 is a flow diagram of a process 500 for detection of vulnerable credentials, executed by the ADS server 140, of FIG. 1, or the sub-components thereof, in accordance with an example of the present disclosure.

At operation 510, a request for a sign-up form, from the client 120, of FIG. 1, to the remote server 180, of FIG. 1, is detected and intercepted by the ADS server 140. In some cases, the request is an HTTP request, for example a GET command.

At operation 520, a code module (e.g., a JavaScript module) is generated in response to the request detection, as previously described.

At operation 530, the code module is provided by the ADS server 140 to the client 120 for subsequent execution. As previously mentioned, the code module is configured to execute on the client in response to an on-submit event associated with the sign-up form, request a credential vulnerability check from the ADM server 150, and report the results back to the ADS server 140.

At operation 540, credential vulnerability results are received by the ADS server 140 from the client 120.

At operation 550, a security action is performed by the ADS server 140 based on the vulnerability result indicating a vulnerable credential. In some cases, the security action may include one or more of blocking the credential submission, requiring that the vulnerable credentials be updated, providing a warning to the client device, logging the vulnerability, and generating an alert to an administrator.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for Detection of Vulnerable Credentials

Figure 6:
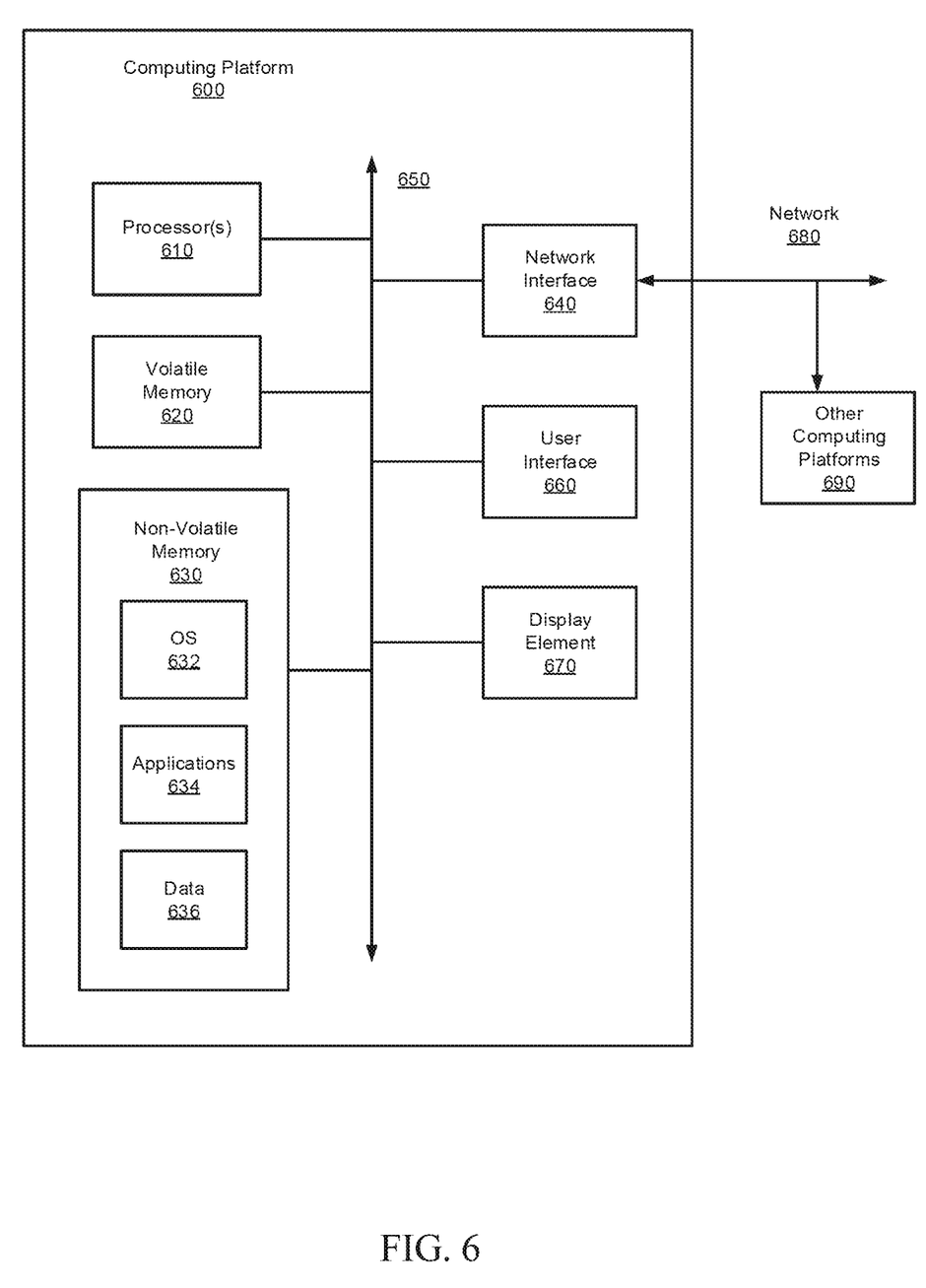
FIG. 6 is a block diagram of a computing platform configured to perform a process for dynamic detection of vulnerable credentials, in accordance with an example of the present disclosure.

FIG. 6 is a block diagram of a computing platform 600 configured to perform a process for dynamic detection of vulnerable credentials, in accordance with an example of the present disclosure. In some cases, the platform 600 may be the ADS server 140, of FIG. 1. In some cases, the platform 600 may be the client device 120, of FIG. 1. The client device may be a 120 may be a laptop, mobile device, smartphone, or workstation.

The computing platform or device 600 includes one or more processors 610, volatile memory 620 (e.g., random access memory (RAM)), non-volatile memory 630, one or more network or communication interfaces 640, user interface (UI) 660, display element (e.g., screen) 670, and a communications bus 650. The computing platform 600 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 660 can include one or more input/output (I/O) devices (e.g., a mouse, a keyboard, a microphone, one or more speakers, one or more biometric scanners, one or more environmental sensors, and one or more accelerometers, etc.).

The display element 670, can provide a graphical user interface (GUI) and in some cases, may be a touchscreen or any other suitable display device.

The non-volatile memory 630 stores an operating system 632, one or more applications 634, and data 636, such that, for example, computer instructions of the operating system 632 and the applications 634, are executed by processor(s) 610 out of the volatile memory 620. For the case where the platform 600 is the client device 120, the applications 634 can include the web browser 130, of FIG. 1. For the case where the platform 600 is the ADS server 140, the applications 634 can include elements of the ADS server such as the JavaScript generator 160 of FIG. 1. In some examples, the volatile memory 620 can include one or more types of RAM and/or a cache memory that can offer a faster response time than a main memory. Data can be entered through the user interface 660. Various elements of the computer 600 can communicate via the communications bus 650.

The illustrated computing platform 600 is shown merely as an example client device or server and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital, or mixed. In some examples, the processor 610 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing.

In described examples, the computing platform 600 can execute an application on behalf of a user of a client device. For example, the computing platform 600 can execute one or more virtual machines managed by a hypervisor. Each virtual machine can provide an execution session within which applications execute on behalf of a user or a client device, such as a hosted desktop session. The computing platform 600 can also execute a terminal services session to provide a hosted desktop environment. The computing platform 600 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
   a memory; and
   at least one processor coupled to the memory and configured to:
      detect a request for a sign-up form from a client device to a remote server;
      generate code based on the detection, the code configured to request a credential vulnerability check from an application management server, wherein the vulnerability check comprises checking against a database of passwords that are known to be vulnerable;
      generate, based on the request for the sign up form, a unique client session identifier and unique token corresponding to a Uniform Resource Locator (URL) of the request for the sign up form;
      provide the unique client session identifier, the unique token, and the URL to the application management server;
      provide the code and a cookie containing the client session identifier to the client device for execution on the client device;
      receive a result of the credential vulnerability check from the client device; and
      perform a security action in response to the credential vulnerability check indicating vulnerable credentials, wherein the security action includes one or more of requiring that the vulnerable credentials be updated, blocking submission of the sign-up form to the remote server, providing a warning to the client device, logging the vulnerability, and generating an alert to an administrator.

2. The computer system of claim 1, wherein the code is JavaScript.

3. The computer system of claim 1, wherein the code includes an on-submit event handler configured to trigger execution of the code in response to a submission of the sign-up form.

4. The computer system of claim 1, wherein the code is configured to generate a hash of credentials included in the sign-up form and to include the hash in the request for the credential vulnerability check.

5. The computer system of claim 1, wherein the code is configured to maintain consistent password-setting rules across a plurality of applications.

6. The computer system of claim 1, wherein the computer system parses the sign up form to identify the mechanism for form submission.

7. The computer system of claim 1, wherein the credential vulnerability check is initiated at the application management server and is triggered by the client device.

8. A method for detection of vulnerable credentials comprising:
   detecting, by a computer system, a request for a sign-up form from a client device to a remote server;

generating, by the computer system, code based on the detection, the code configured to request a credential vulnerability check from an application management server, wherein the vulnerability check comprises checking against a database of passwords that are known to be vulnerable;

generating, based on the request for the sign up form, a unique client session identifier and unique token corresponding to a uniform resource locator (URL) of the request for the sign up form;

providing the unique client session identifier, the unique token, and the URL to the application management server;

providing the code and a cookie containing the client session identifier to the client device for execution on the client device;

receiving, by the computer system, a result of the credential vulnerability check from the client device; and performing, by the computer system, a security action in response to the credential vulnerability check indicating vulnerable credentials, wherein the security action includes one or more of requiring that the vulnerable credentials be updated, blocking submission of the sign-up form to the remote server, providing a warning to the client device, logging the vulnerability, and generating an alert to an administrator.

9. The method of claim 8, wherein generating the code includes generating JavaScript.

10. The method of claim 8, wherein generating the code includes generating an on-submit event handler configured to trigger execution of the code in response to a submission of the sign-up form.

11. The method of claim 8, wherein generating the code includes generating code configured to generate a hash of credentials included in the sign-up form and to include the hash in the request for the credential vulnerability check.

12. The method of claim 8, wherein the code is configured to maintain consistent password-setting rules across a plurality of applications.

13. The method of claim 8, wherein the computer system parses the sign up form to identify the mechanism for form submission.

14. The method of claim 8, wherein the credential vulnerability check is initiated at the application management server and is triggered by the client device.

15. A non-transitory computer readable medium storing executable sequences of instructions to provide detection of vulnerable credentials, the sequences of instructions comprising instructions to:

detect a request for a sign-up form from a client device to a remote server;

generate code based on the detection, the code configured to request a credential vulnerability check from an application management server, wherein the vulnerability check comprises checking against a database of passwords that are known to be vulnerable;

generate, based on the request for the sign up form, a unique client session identifier and unique token corresponding to a uniform resource locator (URL) of the request for the sign up form;

provide the unique client session identifier, the unique token, and the URL to the application management server;

provide the code and a cookie containing the client session identifier to the client device for execution on the client devicei receive a result of the credential vulnerability check from the client device; and perform a security action in response to the credential vulnerability check indicating vulnerable credentials, wherein the security action includes one or more of requiring that the vulnerable credentials be updated, blocking submission of the sign-up form to the remote server, providing a warning to the client device, logging the vulnerability, and generating an alert to an administrator.

16. The computer readable medium of claim 15, wherein the code is JavaScript.

17. The computer readable medium of claim 15, wherein the code includes an on-submit event handler configured to trigger execution of the code in response to a submission of the sign-up form.

18. The computer readable medium of claim 15, wherein the code is further configured to generate a hash of credentials included in the sign-up form and to include the hash in the request for the credential vulnerability check.

19. The computer readable medium of claim 15, wherein the code is configured to maintain consistent password-setting rules across a plurality of applications.

20. The computer readable medium of claim 15, wherein the computer system parses the sign up form to identify the mechanism for form submission.

21. The computer readable medium of claim 15, wherein the credential vulnerability check is initiated at the application management server and is triggered by the client device.

* * * * *